No. 645,294. Patented Mar. 13, 1900.
W. HILLMAN.
JOINT FOR TUBES.
(Application filed July 31, 1899.)
(No Model.) 2 Sheets—Sheet 1.
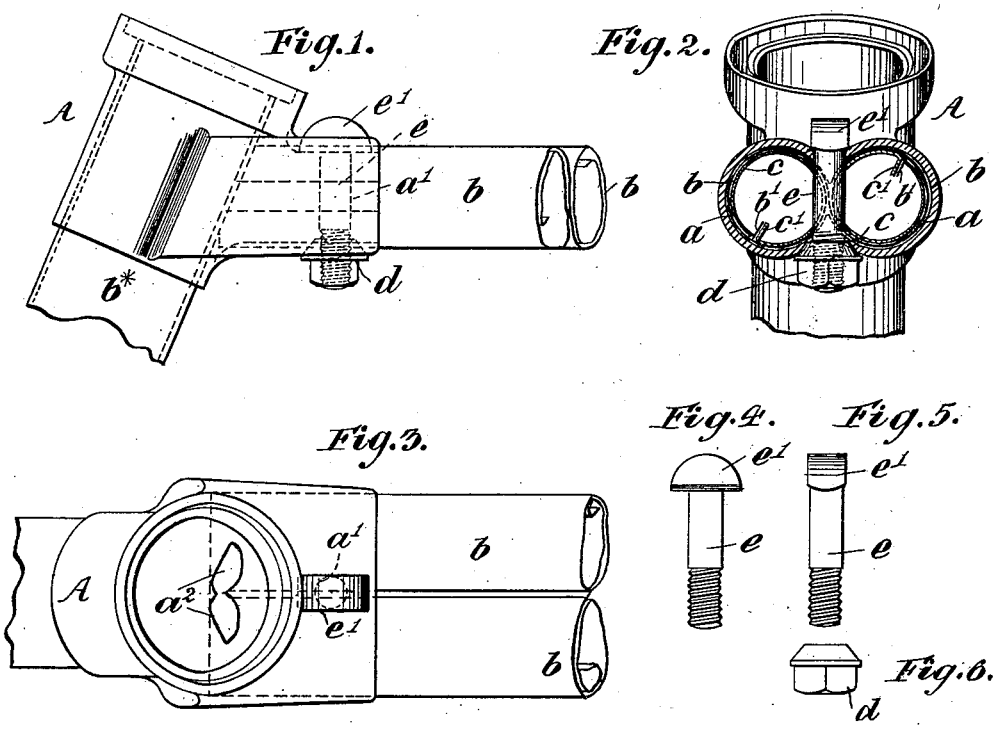
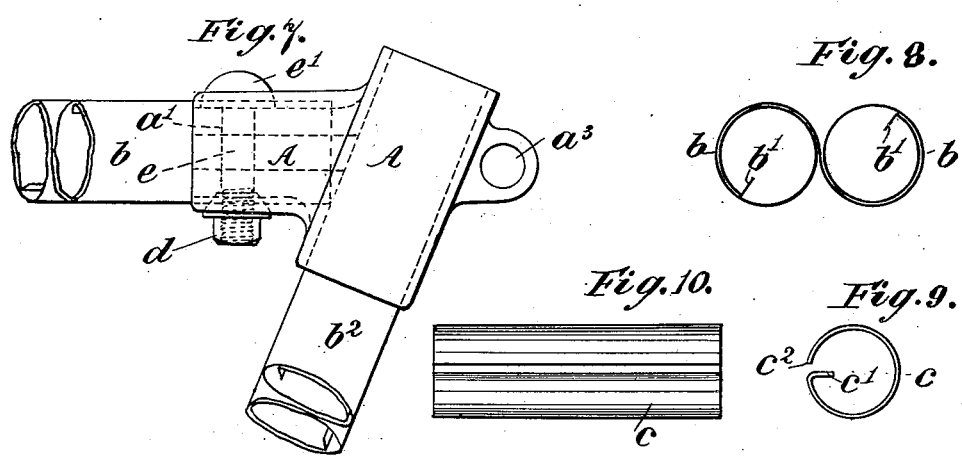
Witnesses.
E. A. Finckel.
Nellie Callahan.
Inventor.
William Hillman
by W. N. Finckel
Atty.

No. 645,294. Patented Mar. 13, 1900.
W. HILLMAN.
JOINT FOR TUBES.
(Application filed July 31, 1899.)
(No Model.) 2 Sheets—Sheet 2.
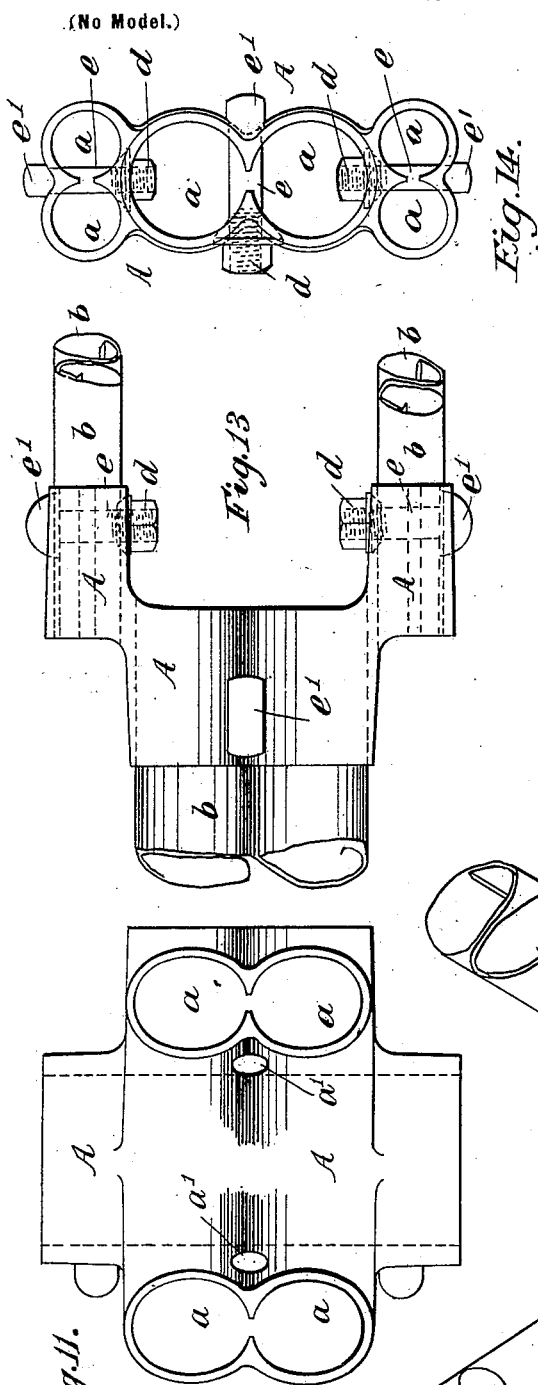
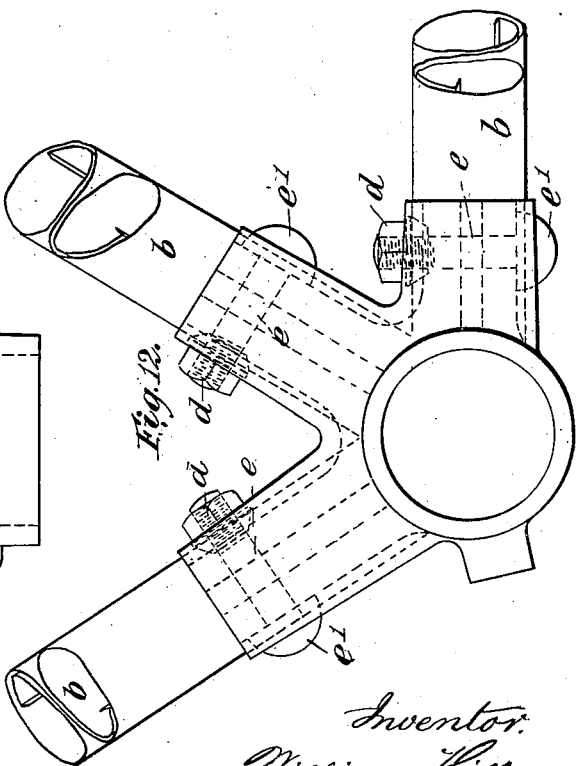
Witnesses.
E. A. Finckel.
Nellie Callahan.
Inventor.
William Hillman.
by Wm. H. Finckel
Atty.

UNITED STATES PATENT OFFICE.

WILLIAM HILLMAN, OF COVENTRY, ENGLAND.

JOINT FOR TUBES.

SPECIFICATION forming part of Letters Patent No. 645,294, dated March 13, 1900.

Application filed July 31, 1899. Serial No. 725,649. (No model.)

*To all whom it may concern:*

Be it known that I, WILLIAM HILLMAN, a subject of the Queen of Great Britain, residing at Coventry, in the county of Warwick, England, have invented a new and useful Joint for Tubes, of which the following is a full, clear, and exact description, and for which I have made application for patent in Great Britain, No. 1,998, dated January 28, 1899.

My improved joint is designed to joint up or connect the tubes in velocipedes and the frames of motor-cars, but is applicable for other purposes, the object being to so construct the frame of a machine that it may readily be taken to pieces for packing or other purposes.

I will describe my invention as applied to a velocipede-frame of the usual construction.

Figure 1 is an elevation of the lug at the top of the head and short lengths of tubes inserted therein. Fig. 2 is a sectional rear view, and Fig. 3 is a plan of the same. Figs. 4 and 5 are two views at right angles of a bolt used for connecting up the frame, and Fig. 6 is an elevation of the nut used therewith. Fig. 7 is an elevation of the seat-pillar lug with short lengths of tubes inserted therein. Fig. 8 shows a section of the tube for which I obtained Letters Patent in the United States of America, dated August 9, 1898, and numbered 608,678. Fig. 9 is a section of one of the liners employed by me in carrying this invention into effect, and Fig. 10 is a plan or side view of the same. Figs. 11 and 12 are respectively a plan and an elevation of a bottom bracket, the latter figure having short lengths of tubing fitted therein. Fig. 13 is a plan of the crown for the back fork, and Fig. 14 is a front view of the same.

My invention relates more particularly to a joint for jointing up tubes constructed in accordance with the specification of the said Letters Patent No. 608,678; but it is also applicable for jointing up two separate tubes placed side by side.

As shown in the drawings, each of the lugs A is formed with two sockets $a\ a$, bored to fit my improved double tubing $b$ or two separate tubes. These sockets $a\ a$ are parallel and are so bored as to just intersect each other, and the metal is somewhat cleared away at the intersection.

In jointing up a velocipede-frame composed of my improved double tube $b$ (shown in carrying out my invention in section in Fig. 8) and of cast or stamped connecting-lugs bored as above described I fit a pair of bushes or liners $c$ in each end of such of the tubes $b$ as it is desired to make detachable, and I immerse the ends of such tubes $b$ in a flux and then in molten solder to thoroughly cement the tube ends and the liners $c$. The liners $c$ are preferably formed of sheet metal bent to the section shown in Fig. 9, thereby forming an interior web $c'$, which presses against one side of the web $b'$ of the tube $b$, while the edge $c^2$ of such liner lies against the other side of the web $b'$. When cold and cleaned off, I insert the tubes $b$ in the lugs A, which have been bored to receive them. I then bore a comparatively-small hole $a'$ through the lugs A and tubes $b\ b$ exactly between the two cylinders forming the said double tube $b$, and I countersink one end of said hole to fit the conical portion of the nut $d$. A screw-bolt $e$, having a narrow head $e'$, rounded on its under side to fit the groove formed along the lugs A at the junction of the two sockets $a$, is then passed through the hole $a'$ and the nut $d$ is tightened up. This nut draws the metal of the two sockets $a$ tightly around the two cylinders of the tube $b$, and thus forms a rigid joint, but one which may be readily detached when desired. The bolt $e$ also engages the edges of the bored portions of the tubes $b\ b$, and thereby prevents said tubes from turning in the sockets. The hole $a'$ also passes across one side of each liner $c$, thus giving the bolt $e$ a larger bearing-surface than if it merely passed through the hole in the tubes $b$.

It will be seen that the lug shown in Fig. 1 is formed to fit a double tube $b$ or two separate tubes passing therefrom rearwardly in a horizontal direction; but it is also formed to fit a single tube $b^*$ to act as the exterior of the head, and this latter tube is soldered or brazed in position. I have not thought it necessary to show the lug forming the lower portion of the head, as it is practically a repetition of the lug shown in Fig. 1.

The tube $b^2$ is soldered or brazed into its lug, as shown in Fig. 7, and receives the seat-pillar, made of two separate tubes.

The hole $a^2$ (shown in Fig. 3) is produced by the tools used in boring the sockets $a$, passing through the interior wall of the casting or stamping forming the lug.

The upper back fork may be connected to the seat-pillar lug by a bolt passing through the eye $a^3$ in the usual manner.

Having fully described my invention, what I claim, and desire to secure by Letters Patent, is—

1. In a joint for jointing or connecting up double parallel tubes, the combination of a lug having two parallel intersecting cylindrical sockets bored to fit such tubes, a hole bored through such lug and tubes intermediate of the two sockets, a countersunk end to such hole, a bolt passed through such hole having a narrow head to fit the groove in the lug between the sockets, and a nut having a conical head to fit the end of the countersunk hole and adapted to screw onto the bolt to thereby compress the sockets about the tubes, substantially as set forth.

2. In a joint for jointing or connecting up double parallel tubes, the combination of a lug having two parallel intersecting cylindrical sockets bored to fit such tubes, liners soldered in the ends of such tubes, a hole bored through such lug, tubes and liners intermediate of the two sockets, a countersunk end to such hole, a bolt passed through such hole having a narrow head to fit the groove in the lug between the sockets, and a nut having a conical head to fit the end of the countersunk hole and adapted to be screwed onto the bolt to thereby compress the sockets about the tubes, substantially as set forth.

3. In a joint for jointing or connecting up double parallel tubes made from a single sheet of metal and having internal webs, the combination of a lug having two parallel intersecting cylindrical sockets bored to fit such tubes, liners having webs and soldered in the ends of said tubes, a hole bored through such lug, tubes and liners intermediate of the two sockets, having a countersunk end, a bolt passed through such hole and having a narrow head to fit the groove in the lug between its sockets, and a nut having a conical head to fit the countersunk end of the hole and adapted to be screwed onto the bolt to thereby compress the sockets about the tubes, substantially as set forth.

In testimony whereof I affix my signature in presence of two witnesses.

W. HILLMAN.

Witnesses:
  MONTAGUE WILKS,
  ARTHUR WM. LIGGINS.